May 8, 1956 R. E. ROBERTSON ET AL 2,744,440
CELL HOLDER FOR A SPECTROPHOTOMETER
Filed July 19, 1954
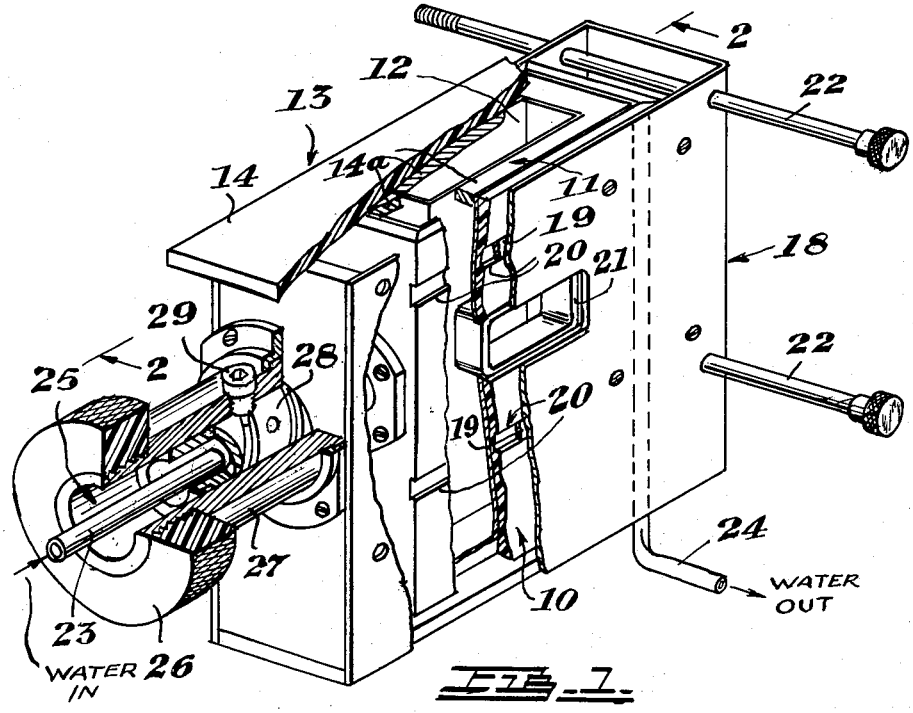
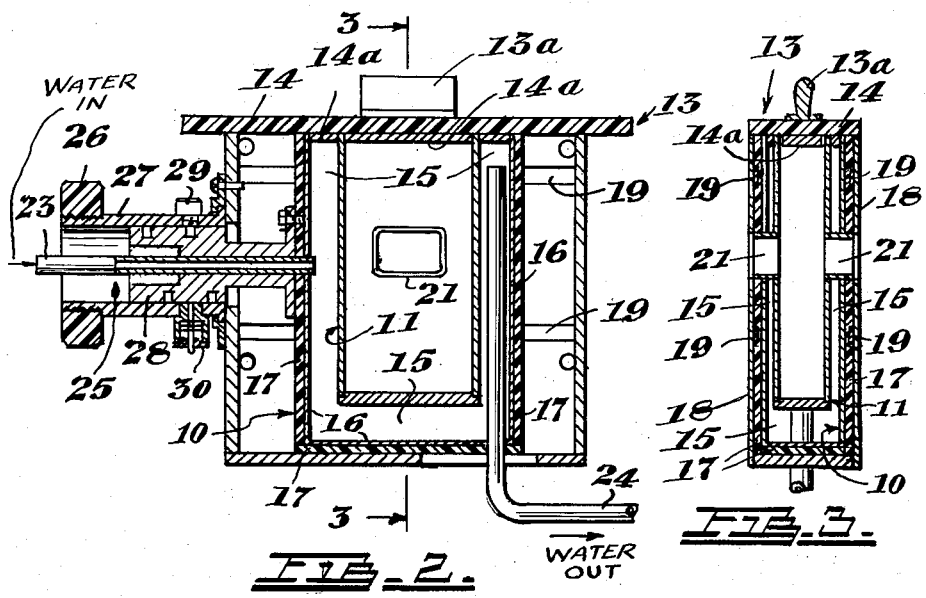
INVENTORS
ROSS E. ROBERTSON
& DAVID N. GLEW
By—*Smart & Biggar*
ATTORNEYS United States Patent Office 2,744,440
Patented May 8, 1956

2,744,440
CELL HOLDER FOR A SPECTROPHOTOMETER

Ross Elmore Robertson and David Neville Glew, Ottawa, Ontario, Canada, assignors to National Research Council, Ottawa, Ontario, Canada, a body corporate of Canada Application July 19, 1954, Serial No. 444,328

10 Claims. (Cl. 88—14)

The invention relates to a cell holder for use with a spectrophotometer, and is particularly concerned with temperature control of such a cell holder.

The study of reaction kinetics and chemical equilibria requires accurate temperature control of the system being examined. In many cases a spectrophotometric method of analysis is chosen because it does not disturb the system. In order to make an accurate study of reactions or equilibria utilizing the spectrophotometric method of analysis it is necessary to control the temperature of the system at the same time as the measurements are made.

Several types of cell holders have been designed for the purpose of controlling the temperature of the cells being examined but these have not provided as satisfactory temperature control as is desirable.

In a known type of cell holder, thermostated water is circulated through shells attached to either side of the cell compartment. Although the structure of such equipment is relatively simple, it has not provided satisfactory temperature control, partly for the reason that the thermostated water is circulated on only two sides of the cells. In other constructions a small thermostat has been built into the cell compartment, and in addition to having the well known defects of small thermostats this equipment is inconvenient to use and introduces new difficulties inherent in the design.

With apparatus in accordance with the present invention thermostated water can be circulated around substantially all of the outer surfaces of at least five sides of a box-like cell compartment and by use of thermal insulation steady thermal gradients are established of a low value. According to the invention a cell holder comprises an outer watertight compartment, means for conveying a liquid into the outer compartment, means for conveying a liquid out of the outer compartment, and an inner compartment assembled within the outer compartment and fixed thereto; the inner compartment having an opening through which a cell can be placed within it. A space is provided between the wall of the outer compartment and the wall of the inner compartment sufficient for flow of liquid therebetween, this space substantially surrounding all sides of the inner compartment except for its opening. The opening into the inner compartment is provided with a lid having a layer of a thermal insulating material. Preferably the walls of the outer compartment comprise a layer of solid thermal insulating material which provides for steady thermal gradients to be established through the walls of the outer compartment.

In a preferred construction in accordance with the invention the holder includes an outer framework for supporting the outer compartment and, between this framework and the outer compartment, there is arranged a track and groove whereby the outer compartment may be moved back and forth relative to the framework. This provides for adjustment of the position of the cell or cells held within the inner compartment to be adjusted in relation to the light beam from a spectrophotometer. Preferably, the adjustment of the position of the inner compartment is controlled by a knob-driven large pitch screw and nut drive connected between the outer framework and the outer compartment.

In a cell holder in accordance with the invention the temperature of each cell placed within the inner compartment can be very accurately controlled by circulation of thermostated water past substantially all of the outer surfaces of five walls of the inner compartment. The source of the thermostated water need not be limited in its capacity due to the design of the cell holder because it is entirely separated from it except for interconnecting tubing to carry the thermostated water into and out of the space between the inner and outer compartments of the cell holder. The source of thermostated water may be a large tank containing both fixed and on-off heaters controlled by a thermostat which provides close temperature control in the order of ±0.002° C. at 25° C. The design of such a source of thermostated water is well known and therefore is not described in the present specification.

The invention will be further described with reference to the accompanying drawings in which:

Figure 1 is a perspective view partly broken away of a cell holder according to the invention, Figure 2 is a section of the cell holder shown in Figure 1 taken on the line 2—2, and Figure 3 is a section of the cell holder shown in Figure 1 taken on the line 3—3 of Figure 2.

The cell holder shown in the drawings comprises an outer watertight compartment 10 and an inner compartment 11 assembled within the outer compartment 10 and fixed rigidly thereto. The inner compartment 11 has an opening 12 (Figure 1) for which is provided a lid 13 (Figures 2 and 3) having a handle 13a and including a layer 14 of a thermal insulating material such as that known under the trade name "Bakelite." The lid 13 also has a layer 14a of a good heat conductor, such as brass, fixed to its underside so as to close the openings to both the inner and outer compartments. A space 15 is provided between the inner compartment 11 and the outer compartment 10 and extends around substantially all of five sides of the inner compartment 11. The inner compartment 11 is made of a good heat conducting material such as brass while the outer compartment 10 may have a brass watertight liner 16 but also is provided with a layer 17 of a thermal insulating material such as that known under the trade name "Teflon."

The outer compartment 10 is supported within a framework 18 by means of brass rails 19 attached to the outer framework 18 and arranged to mate with grooves 20 cut in the layer 17 of insulating material on the outside of the outer compartment 10. The rails 19 and the grooves 20 provide for sliding of the outer compartment (along with the inner compartment 11 which is fixed within it) back and forth within the framework 18. Some clearance should be provided between the outer surface of the outer compartment 10 and the inner surface of the framework 18 to permit movement of the outer compartment without friction between these surfaces.

A light opening 21 is provided through the assembly so that when the outer framework is mounted on a spectrophotometer (by means of screws 22 shown in Figure 1) the light opening 21 can be placed in alignment with the light beam from the spectrophotometer.

Provision is made to circulate thermostated water within the space 15. The thermostated water enters the space 15 by a pipe 23 and leaves by a pipe 24. Various arrangements of these pipes may be made but care should be taken that the thermostated water circulates past all the surfaces of the inner compartment 11 which are exposed to the space 15. The arrangement shown of the inlet pipe being centrally located has the advantage that the water sweeps symmetrically above and below the light opening 21. However, the inlet for the thermostated water might be at the bottom of the space 15. The exit pipe is extended to near the top of the space 15 to avoid accumulation of air in the stream of circulating water. The source of the thermostated water is not shown as the design of a suitable source of thermostated water is well known. As mentioned above the source of thermostated water should be of a relatively large capacity and preferably is equipped with both fixed and on-off heaters so that the temperature of the water can be held within very close limits, for example ±0.002° C. at 25° C.

The cells to be examined, for example standard quartz test cells, may be mounted in a metal cradle as a unit in the usual manner and placed in the inner compartment 11. Other accessories which may be required for a particular test can be mounted and carried above the outer compartment 10. Each cell may then be brought into alignment with the light beam by adjustment of a large pitch screw and nut drive 25 which is driven by a knob 26. The knob 26 is fixed to the nut 27 of the assembly and a thread engagement with the screw 28 is made by a hardened-steel stud 29 as shown in Figure 2. A location stop 30 is provided so that the movement of the inner compartment 11 can be stopped at predetermined locations. The location stop 30 comprises a spring loaded pin pressed toward the outer surface of a screw 28 into which mating openings are cut corresponding to the desired locations. Adjustment of the knob 26 causes the inner compartment 11 to move within the outer framework 18 so that the light opening 21 passes transversely across the light beam of the spectrophotometer. In this way each cell contained by the inner compartment 11 can be brought into alignment with the light beam for examination.

In a cell holder in accordance with the invention and as shown in the drawings, steady thermal gradients can be established and the thermal losses have low and constant value. This results from structure whereby the thermostated water is circulated on five sides of the inner compartment 11 and, further, from the provision of a layer of a thermal insulating material in the walls of the outer compartment such as the thermal insulating material 17. Location of the thermostated inner compartment 11 by a large pitch screw gives positive location of the cells within the spectrophotometer beam. The whole assembly, as indicated by Figure 3, is of a narrow width as is desirable in this equipment. The complete unit may be conveniently assembled or dis-assembled from the spectrophotometer by means of the bolts 22 shown in Figure 1.

What we claim as our invention is:

1. A cell holder for a spectrophotometer comprising an outer box-like water-tight compartment of which the walls include a layer of a thermal insulating material, means for conveying a liquid into the outer compartment, means for conveying a liquid out of the outer compartment, an inner box-like compartment assembled within the outer compartment, the inner compartment having an opening through which a cell can be placed within it, a space between the walls of the outer compartment and the walls of the inner compartment sufficient for flow of liquid therebetween, said space substantially surrounding all walls of the inner compartment, and a thermal insulating cover for said opening in the inner compartment.

2. A cell holder as defined in claim 1 in which the heat insulating cover extends across the outer compartment and includes a layer of a good heat conductor next the inner and outer compartments.

3. A cell holder as defined in claim 2 in which the walls of the outer compartment comprise a layer of a solid thermal insulating material, said holder comprising an outer framework for supporting the outer compartment, a track and groove arrangement between the outer compartment and said framework whereby the outer compartment and the inner compartment assembled within said outer compartment may be moved back and forth relatively to said framework.

4. A cell holder as defined in claim 3 comprising a knob-driven large pitch screw and nut drive connecting between the outer framework and the outer compartment whereby the outer compartment may be moved back and forth relatively to said framework.

5. A cell holder as defined in claim 4 comprising an opening extending through the outer framework, the outer compartment and the inner compartment whereby a beam of light can be directed through a cell located in the inner compartment.

6. A cell holder as defined in claim 5 in which the inner compartment is a box having six sides of which substantially all of the outer surfaces of five sides are exposed to the space between the inner and outer compartments.

7. A cell holder for use with a spectrophotometer having a light beam emitting window, comprising an outer water-tight compartment having walls including a layer of thermal insulating material, means for continuous conveying of a liquid into the outer compartment, means for continuous conveying of a liquid out of the outer compartment, an inner compartment assembled within the outer compartment and separated therefrom by a space sufficient for flow of liquid therebetween, the inner compartment having an opening through which a cell can be placed within it, an outer framework for supporting the outer compartment against the light beam emitting window of the spectrophotometer; an opening extending through said outer framework, the outer compartment and the inner compartment whereby a light beam from said window can be directed through a cell located in the inner compartment.

8. A cell holder as defined in claim 7 in which the inner compartment is a metal box having six sides of which substantially all of the outer surfaces of five sides are exposed to the space between the inner and outer compartments.

9. A cell holder as defined in claim 8 comprising a cover for the opening through which a cell can be placed in the inner compartment, said cover having an outer thermal insulating layer and an inner layer of a good heat conductor, said inner layer extending across both the inner and outer compartments.

10. A cell holder as defined in claim 9 in which the inner compartment can accommodate a plurality of cells side by side and comprising a knob-driven large pitch screw and nut drive connecting between the outer framework and the outer compartment whereby the outer compartment may be moved back and forth relatively to said framework thereby to bring said cells separately into the light beam.

References Cited in the file of this patent

UNITED STATES PATENTS

| | | |
|---|---|---|
| 1,230,754 | Moffitt | June 19, 1917 |
| 2,186,915 | Thompson | Jan. 9, 1940 |